Feb. 15, 1927.

V. CONTINSOUZA ET AL 1,617,323

CONTINUOUS FEED CINEMATOGRAPH APPARATUS

Filed July 27, 1925

Inventors
V. Continsouza
M. Combes
by Langner, Parry, Card & Langner
Attys.

Patented Feb. 15, 1927.

1,617,323

UNITED STATES PATENT OFFICE.

VICTOR CONTINSOUZA AND MAURICE COMBES, OF PARIS, FRANCE.

CONTINUOUS-FEED CINEMATOGRAPH APPARATUS.

Application filed July 27, 1925, Serial No. 46,460, and in France November 17, 1924.

Cinematograph apparatus with continuous feed of the film are already known in which the linking up or succession of the pictures is obtained by utilizing a series of lenses carried by a rotary disc arranged in such a way that one of these lenses accompanies each of the film pictures during the passage through the beam of light.

Since in these conditions the lenses describe circular arcs while the film moves in a straight line, the axis of projection tends constantly to be deviated, this resulting in a falling off in the fixity of the projected image.

In order to reduce the curvature of the path of the lenses with a view to diminishing this defect as far as possible, it has been sought to employ a disc of comparatively large radius which has to be provided with a relatively large number of lenses, in such a way that the apparatus must necessarily be costly.

If instead of mounting the lenses at fixed points on their supporting disc, they are fitted to members movable in relation to this disc and controlled during the passage through the beam of light in such a way that the lenses then follow at uniform speed a straight-line path parallel to the film, it becomes possible to construct an apparatus which comprises, like that which forms the subject of the present invention, a smaller number of lenses and is therefore lower in cost.

In this apparatus the lenses are spaced around and at a small distance from the axis of rotation of their supporting disc.

The necessary corrective movements can be communicated to them, during the passage through the beam of light, by means of mechanisms occupying the periphery of the disc, where the space available allows of making them very strong and smooth in working; the accessibility of the mechanisms for adjustment and upkeep is moreover increased. Their parts also can be enclosed in a casing forming an oil bath, without the lenses being exposed to fouling by projections of lubricant. Moreover the lens-carrying plate forms a screen and prevents a portion of the light from the projector lamp from travelling directly into the room or on to the projection screen.

The annexed drawing represents by way of example one of the forms of construction of the lens-carrying disc of a cinematograph apparatus according to the invention.

Figure 1:
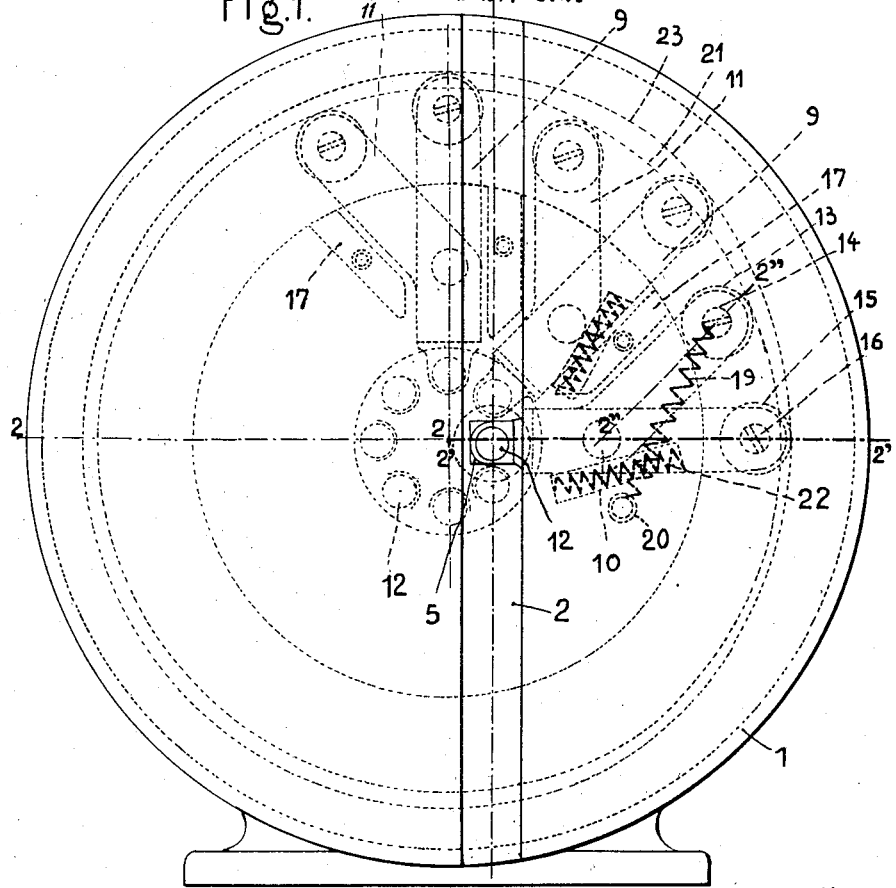

Figure 1 is a view in front elevation.

Figure 2:
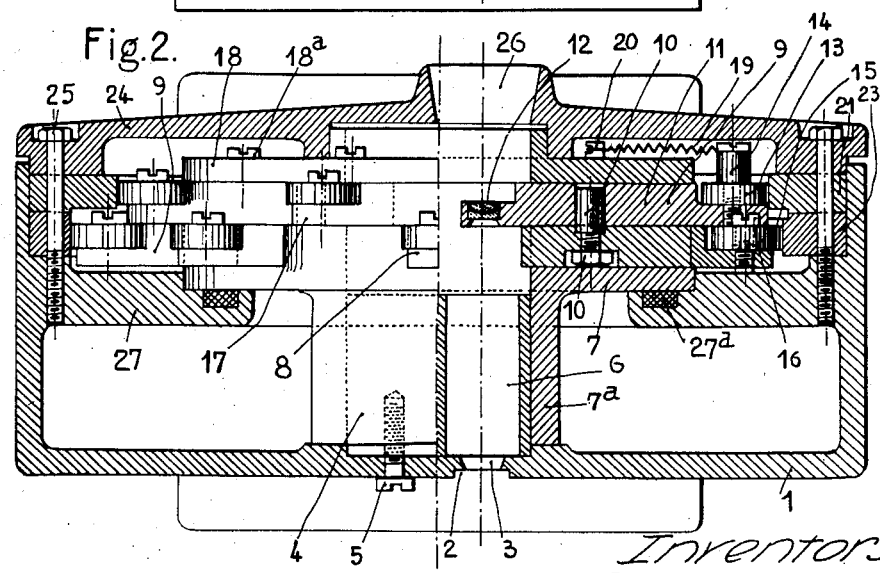

Figure 2 comprises on its left half a plan view, the casing of the device being cut through upon the horizontal plane 2—2 of Figure 1, and on its right half a double section along the broken line 2'—2'—2"—2" of the same figure.

The frame 1 comprises a straight guide or channel 2 for the passage of the film, the projection aperture being at 3. A shaft 4 is fixed to the frame 1 by means of screws 5 or the like; it is pierced longitudinally with an eccentric hole 6 (through which the beam of light passes) and receives a socket $7^a$ integral with a plate 7.

One of the faces of this plate is slotted at 8 (to the number of eight slots in the example shown) and in these slots there are guided sliders 9; upon the latter there are fixed, by means of nuts $10^a$, pins 10 upon which are pivoted bell crank levers 11.

These levers carry the lenses 12 at their ends which are directed towards the axis of rotation of the plate 7. The other ends of the levers 11 are fitted with eccentric circular shoes 13, secured by screws 14; the corresponding ends of the sliders carry shoes 15 similar to 13 and fixed by screws 16.

The plate 7 carries projecting lugs 17 which receive the clamping screws $18^a$ of a second plate 18, the lugs 17 maintaining the latter at a suitable distance to allow free movement of the levers 11 and the sliders 9, while preventing the former from leaving their pivots and the second from leaving their slots.

Springs, such as 19, attached at one end to the screws 14 and at their other end to the studs 20 on the second plate 18, exert upon the levers 11 a pull tending constantly to press the shoes 13 against a peripheral cam 21. Other springs 22, bearing at one end against the bottom of suitable recesses formed in the disc 7 and at their other end against the bottom of notches in the sliders 9, exert upon the latter a pressure which serves to maintain them in constant contact with another peripheral cam 23, which is clamped against the cam 21, in a recess in the frame 1 by a cheek-plate 24 secured by screws such as 25. The cheek-plate 24 presents at its central portion a recess to receive the end of the shaft 4, being formed with an opening 26 corresponding to the perforation in the said shaft.

The cams 21 and 23 are of such shape as to impart to the sliders and to the lens-carrying levers, during the time in which the lenses pass through the beam of light, the corrective movements which combine with the rotary motion of the disc 7 in such a way that the optical centres of the lenses travel at a uniform speed parallel to the axis of the film.

By turning the shoes 13, 15 upon their axes it is possible to adjust the position and the stroke of the parts which carry them, and when so desired to take up any slack therein.

Since a large space is available for accommodating the sliders and the levers, it is possible to give these members as great strength as is desirable; moreover the levers can be designed of sufficient length to reduce the magnitude of the forces displacing the lenses. The cams 21 and 23, having extensive circumference, can be constructed without difficulty, and they can be given profiles with very gradual variations, so as to avoid sudden abrupt movements of the various parts of the mechanism.

The frame 1 comprises a transverse annular diaphragm 27 with a circular groove receiving a jointing washer 27ª, made of felt, fibre, copper or the like, against which the disc 7 presses. The space, comprised between this diaphragm and the cheek-plate 24, for containing the mechanism, is thus made sufficiently liquid-tight to receive oil up to a certain level, with a view to ensuring the lubrication of the said mechanism, without any risk of the lenses being fouled by the splashing of lubricant.

It is to be understood that the invention is not limited either to the forms or to the details of construction described above, and in particular that the number of lenses may be greater or less than eight, these lenses being capable of receiving their corrective movements by means of any suitable mechanism.

What we claim is:

1. In cinematograph apparatus with continuously moving film, a rotary lens-carrying member adapted to rotate at uniform speed on an axis parallel to the optical axis of the machine, a plurality of lenses mounted for movement toward and away from the center on said member and normally circularly arranged thereupon, and means positioned a greater radial distance from said axis of rotation than said series of lenses for moving said lenses toward or away from said axis of rotation for rectifying the movement of said lenses.

2. In cinematograph apparatus with continuously moving film, a rotary lens-carrying member adapted to rotate at uniform speed on an axis parallel to the optical axis of the machine, a plurality of lenses mounted for movement toward and away from said axis of rotation on said member, and normally circularly arranged thereupon, and means positioned a greater radial distance from said axis of rotation than said series of lenses for moving the lenses successively toward or away from said axis of rotation and at a rate of speed for rectifying the movement thereof and compensating for the variation in the uniform speed of said rotary member incidental to said rectifying movement.

3. In cinematograph apparatus with continuously moving film, a rotary lens-carrying member adapted to rotate at uniform speed on an axis parallel to the optical axis of the machine, a plurality of lenses mounted for movement toward and away from said axis of rotation on said member and normally circularly arranged thereupon, and means positioned a greater radial distance from said axis of rotation than said series of lenses for operating the same, including a slider for each lens guided in a slot with which said rotary member is provided, a lever pivotally mounted upon each slider, a lens carried by each lever, a stationary cam adapted to act upon said sliders and to impart to the same a displacement adapted to give to the center of the corresponding lens a rectilinear path parallel to the axis of the film, and a second stationary cam adapted to act upon the pivoted levers and to displace the same so as to maintain a uniform linear speed for the center of the lens, during the passage thereof through the luminous beam, both cams being arranged externally to the levers and sliders, for the purpose described.

In testimony whereof we have signed our names to this specification.

VICTOR CONTINSOUZA.
MAURICE COMBES.